Sept. 25, 1956  E. R. KUGHLER  2,764,307
POWER SHOVEL ATTACHMENT FOR INDUSTRIAL LIFT TRUCKS
Filed Aug. 23, 1952  4 Sheets-Sheet 1
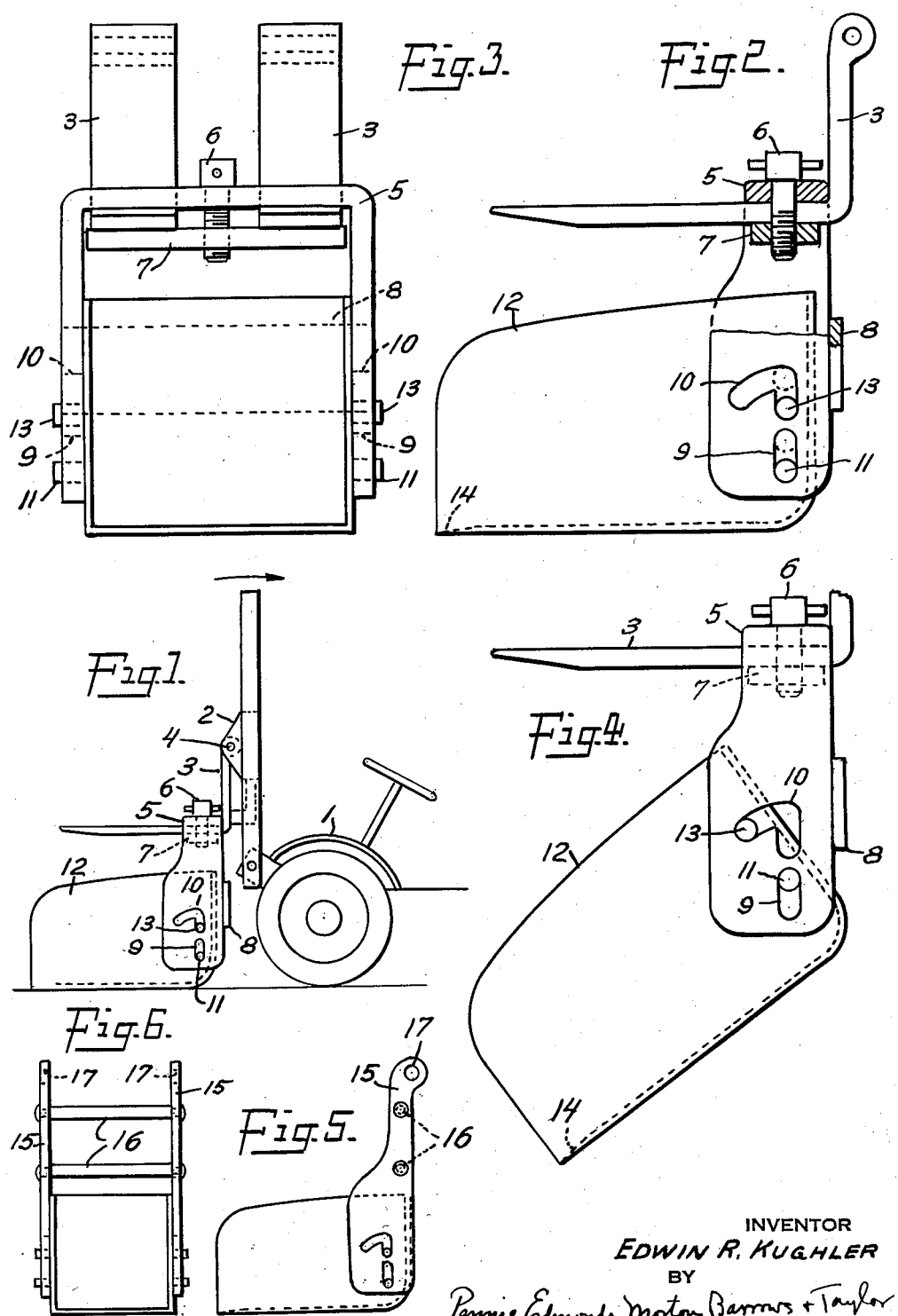
INVENTOR
EDWIN R. KUGHLER
BY
Pennie Edmonds Morton Barrows + Taylor
ATTORNEYS Sept. 25, 1956  E. R. KUGHLER  2,764,307
POWER SHOVEL ATTACHMENT FOR INDUSTRIAL LIFT TRUCKS
Filed Aug. 23, 1952  4 Sheets-Sheet 2
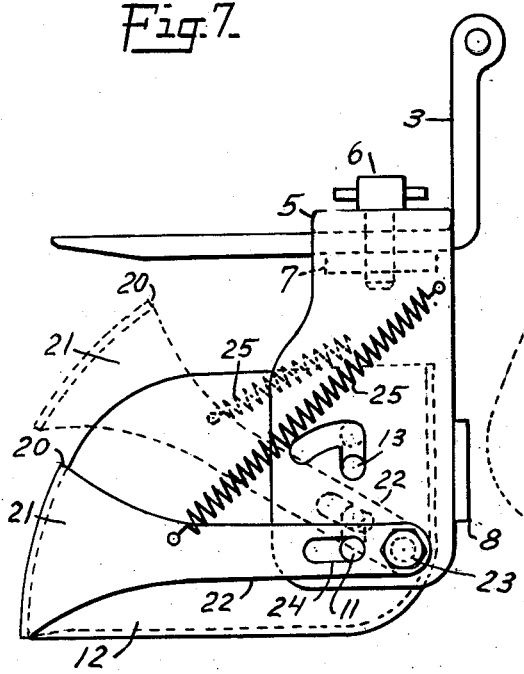
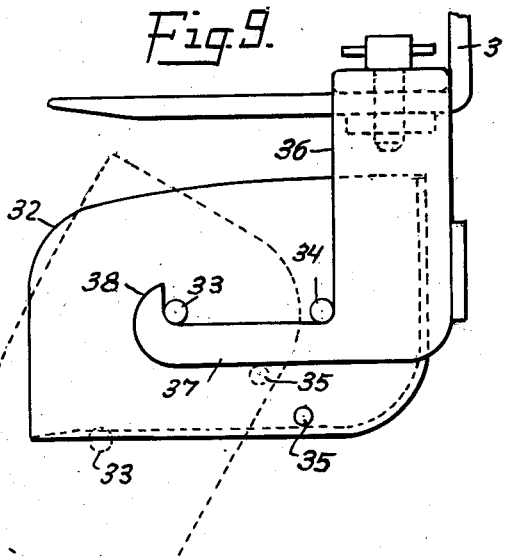
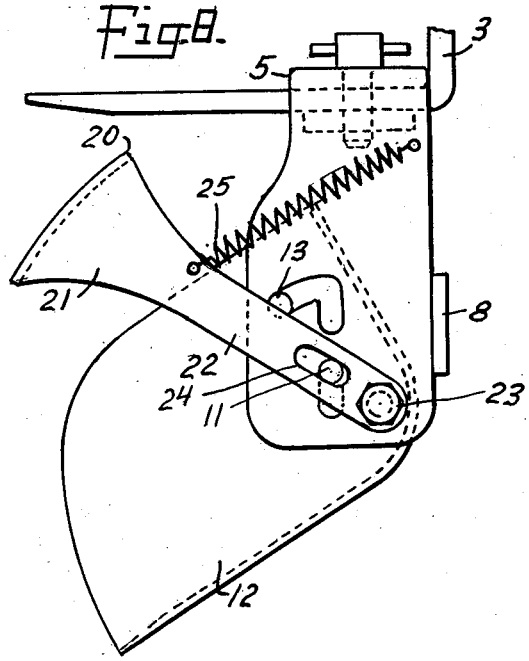
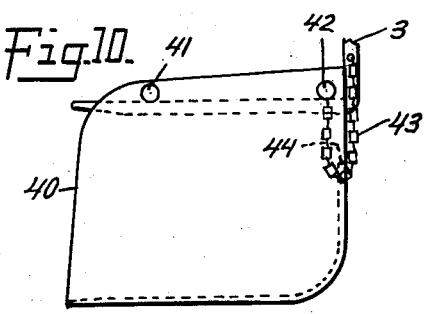
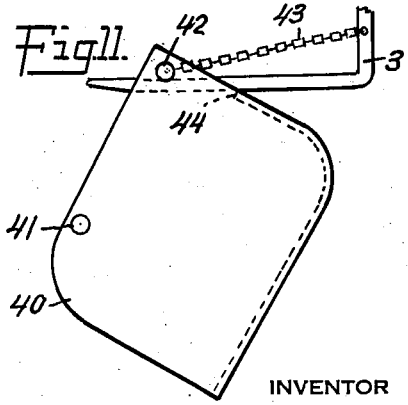
INVENTOR
EDWIN R. KUGHLER
BY
Pennie, Edmonds, Morton, Barrows & Taylor
ATTORNEYS Sept. 25, 1956　　　E. R. KUGHLER　　　2,764,307
POWER SHOVEL ATTACHMENT FOR INDUSTRIAL LIFT TRUCKS
Filed Aug. 23, 1952　　　　　　　　　4 Sheets-Sheet 3
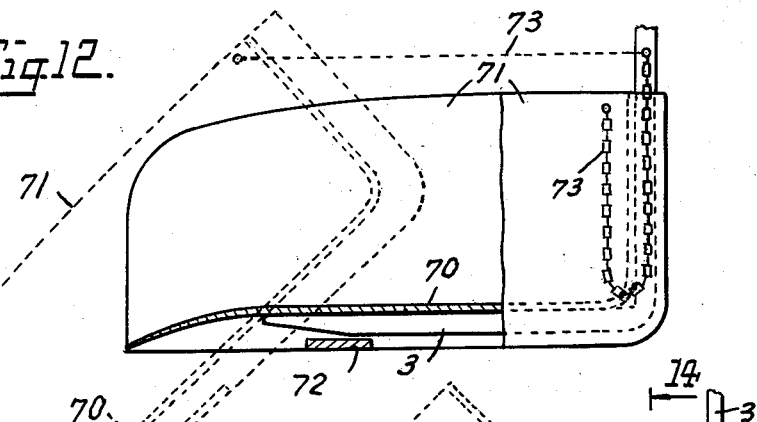
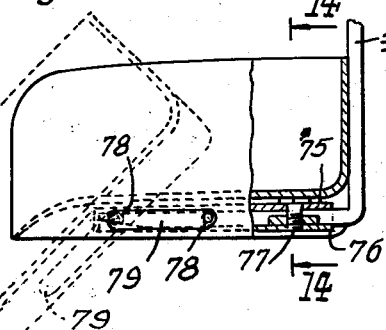
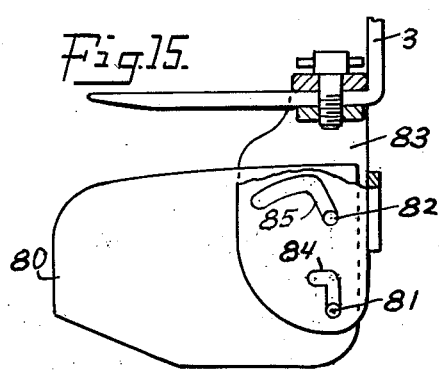
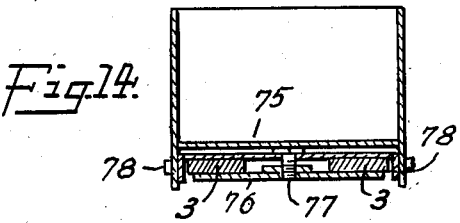
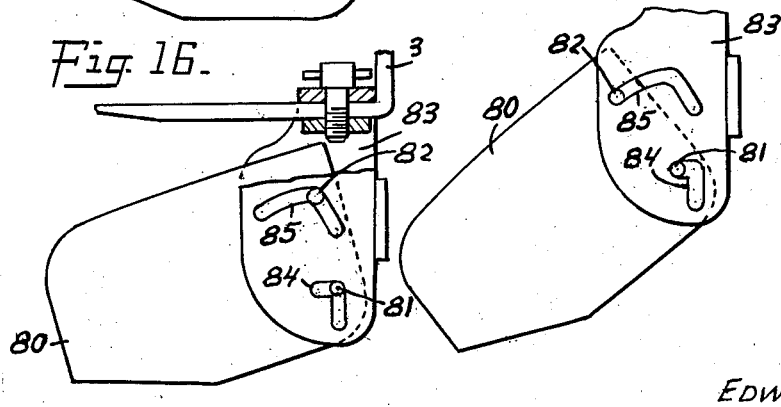
INVENTOR
EDWIN R. KUGHLER
BY
Pennie, Edmonds, Morton, Barrows & Taylor
ATTORNEYS

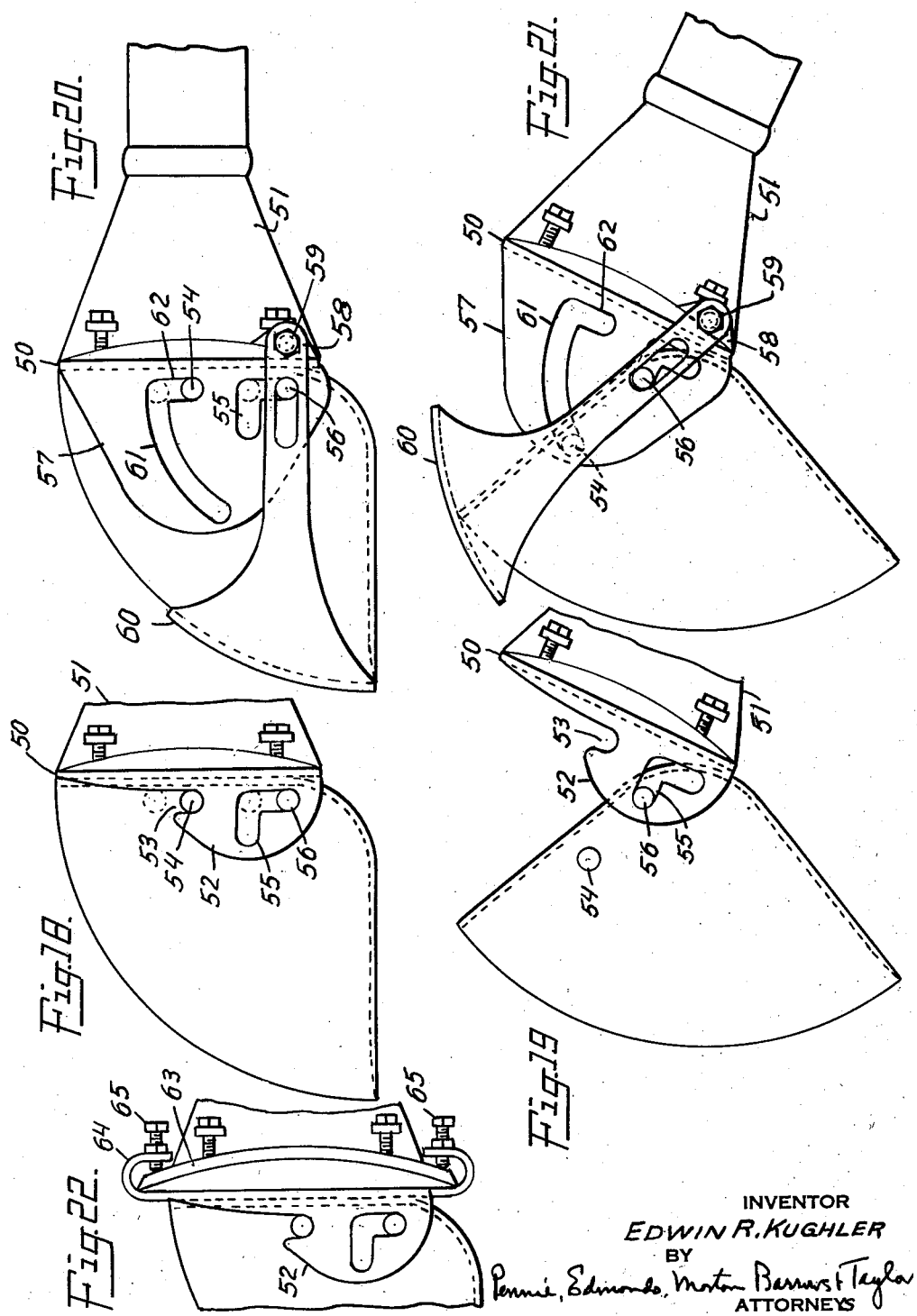

United States Patent Office 2,764,307
Patented Sept. 25, 1956

2,764,307
POWER SHOVEL ATTACHMENT FOR INDUSTRIAL LIFT TRUCKS

Edwin R. Kughler, Rye, N. Y.

Application August 23, 1952, Serial No. 305,936

6 Claims. (Cl. 214—620)

This invention relates to power shovels, particularly shovels of the type to be handled by a conventional lift truck or conventional bulldozer without change in their structure.

A further object of the invention is to provide a power shovel of this character which is fully automatic in operation, requiring no connection with the source of power of the truck or the bulldozer, the entire loading and dumping of the shovel being accomplished by the movement of the shovel or bulldozer on its wheels or tracks and by the raising and lowering of its head upon which the shovel is mounted.

A further object of the invention is to provide a shovel of the character described of simple, rugged construction with a minimum of movable parts and of such design that wide manufacturing tolerances are permitted.

Further objects of the invention will be apparent from the following description and accompanying drawings, wherein I have illustrated several embodiments of my invention designed for attachment to lift trucks and to bulldozers and for different specific uses.

In said drawings:

Fig. 1 is a side elevation showing a portion of the conventional lift truck with one form of my improved shovel attached thereto;

Fig. 2 is a similar view on an enlarged scale partly in section of the shovel illustrated in Fig. 1;

Fig. 3 is a front view of the shovel shown in Fig. 2;

Fig. 4 is a side view similar to Fig. 2 but showing the shovel in dumping position;

Figs. 5 and 6 are side and end views, respectively, on a small scale, of a shovel such as shown in Fig. 1 but designed to be mounted directly on the lift truck cross head;

Figs. 7 and 8 are side views of a shovel such as shown in Figs. 2 and 4 equipped with a movable gate which automatically closes the open side of the shovel during the movement of the shovel with the load while leaving the shovel open during loading and dumping;

Fig. 9 is a side view of a modified form of shovel whereby the entire shovel may be released from the truck;

Figs. 10 and 11 are side views of a modified form of shovel of cheap and simple design;

Fig. 12 is a side view of a modified form of shovel designed to be carried by the horizontal portions of the forks of the truck;

Fig. 13 is a side view of a modified form of the shovel shown in Fig. 12;

Fig. 14 is a section on line 14—14 of Fig. 13;

Figs. 15, 16 and 17 are detail views of a modified form of the shovel shown in Figs. 1 to 4;

Figs. 18 and 19 are detail views showing the shovel of Figs. 1 to 4 as modified for attachment to a bulldozer instead of a lift truck;

Figs. 20 and 21 are side views of a shovel of the type shown in Figs. 7 and 8 as modified for attachment to a bulldozer; and Fig. 22 is a side view of a portion of the shovel shown in Figs. 20 and 21 modified to be attached to a bulldozer blade.

Referring to the drawings, particularly to Figs. 1–4, inclusive, 1 indicates the conventional lift truck having the usual vertical movable cross head illustrated diagrammatically at 2 with the lift fork 3 depending from a cross rod 4 carried thereby. My improved shovel as shown in Figs. 1–4 is designed for attachment to the forks of lift trucks and comprises a yoke 5 of inverted U-shape designed to rest on the forks at the base of their horizontal portions, as shown in Fig. 2. The transverse member of the yoke 5 carries a clamping screw 6 by means of which a clamping bar 7 may be clamped tightly against the under side of the forks to fasten the yoke 5 rigidly to the forks. The two sides of the yoke 5 are connected by a cross bar 8 welded to their rear vertical edges and each of the arms is formed with two slots 9 and 10, respectively, of the shape and location shown in the drawing. The slot 9 is a vertical slot of a length about three times its width, the width being such as to receive loosely a pin 11 set in the side of the shovel 12 at a point near its lower rear corner. The slot 10 has a vertical portion of the same shape and dimensions as the slot 11 and an arcuate portion extending forwardly from the upper end of the vertical portion of the slot, the curve of the arc being on a radius having its center at the upper end of the slot 9 coincident with the center of the pin 11 when that pin is at the upper end of the slot 9. The pin 13 is similar to the pin 11 and projects from the side of the shovel 12 into the slot 10, the two pins being spaced apart a distance such as to permit a relative vertical movement of the yoke 5 and shovel 12 corresponding to the length of the slot 9 and vertical portion of the slot 10.

The shovel 12 comprises vertical side portions spaced apart a distance to fit loosely between the arms of the yoke, a vertical rear wall and a horizontal bottom wall which is sharpened at its forward edge 14, as are also the forward edges of the side walls to facilitate their entrance under the forward movement of the truck into the pile of material from which a shovel load is to be removed.

In using the shovel the operator of the lift truck adjusts the frame on which the cross head 2 moves to perpendicular position with the cross head at such height that the bottom of the shovel rests on the ground. The shovel is forced into the pile of material to be removed and the cross head is then elevated to lift the load clear of the pile and the truck then driven to the point where the load is to be discharged.

To discharge the load the cross head 2 of the lift truck is lowered until the bottom wall of the shovel is stopped by engagement with the surface onto which the load is to be discharged. Continued downward movement of the cross head after the movement of the shovel is stopped causes the yoke 5 to be moved downwardly with respect to the shovel, thereby causing the slots 9 and 10 to move downward with respect to the pins 11 and 13 until the pins are at the upper ends of the slot. In this position the operator of the lift truck moves the truck as a whole backward, at the same time tilting the vertical frame which supports the cross head backwardly at the top in the direction of the arrow in Fig. 1, to thereby cause the pins 13 to enter the arcuate portions of the slots 10 to a sufficient extent for the shovel to tilt about the pin 11 as an axis when the cross head and yoke 5 are elevated as shown in Fig. 4 to thereby dump the contents of the shovel.

In order to restore the shovel to position to pick up a second load the operator has merely to lower the cross head until the shovel is contacted with the ground with the vertical frame tilted to position with its bottom wall parallel with the forks of the truck. The cross head is then elevated without tilting the vertical frame of the lift truck and the parts are restored to the position shown in Fig. 1, wherein the pins 11 and 13 hold the shovel rigidly against tilting movement.

Instead of designing the yoke 5 as an attachment to the forks of the lift truck, the supporting yoke for the shovel may be constructed as shown in Figs. 5 and 6 of two side arms 15 connected together by cross bars 16 and with holes 17 at the upper ends of the arms 15 of a size to fit over the cross rod 4 in the same manner as the upper end of the forks 3 of the conventional lift truck. In Figs. 7 and 8 I have shown the shovel of Figs. 1–4 inclusive equipped with a load-retaining gate 20 which is automatically positioned to maintain the load when the shovel is being transported by the lift truck with the pins 11 and 13 at the bottom of their respective slots, and is automatically raised to permit the loading and dumping of the shovel when the pins are at the upper ends of their respective slots.

As here shown, the gate 20 consists of a U-shaped member whose cross portion 21 is shaped to fit over the open front of the shovel with the lower edge of the part 21 adjacent and parallel with the edge 14 of the shovel when the gate is closed, as shown in solid lines in Fig. 7. The side arms 22 of the gate 21 are spaced apart a distance to embrace the side arms of the yoke 5 and extend rearwardly to bolts 23 set in the side arms 5 of the yoke to the rear of the slots 9 and in horizontal alignment with the lower ends of the slots.

Formed in the side arms 22 of the gate 20 in front of the pins 23 and in position to receive the ends of the pins 9 are slots 24 extending parallel with the arms and parallel with the bottom wall of the shovel when the gate is in closed position as shown in Fig. 7. A spring 25 is preferably provided for normally holding the gate 21 in raised position when permitted by the position of the pins 13 in the slots 24. The spring 25 is strong enough to normally hold the gate in its elevated position and also to hold the empty shovel in position with the pins 11 and 13 at the upper ends of the slots. When, however, the forks are elevated to lift the loaded shovel, the weight of the load on the shovel holds it down so that the upward movement of the yoke 5 to which the pins 23 are fastened will cause the gate to turn on the pins 11 and thus close off the open end of the shovel so that when the shovel is raised by the continued vertical movement of the cross head the load will be held against spilling.

In Fig. 9 I have shown a modified form of shovel wherein the shovel is completely detached from the supporting yoke. As here shown the shovel 32 has three pins 33, 34 and 35, respectively, in each side wall, the pins being arranged as shown. Pins 33 and 34 are in horizontal alignment about midway the height of the shovel while pin 35 is in approximately vertical alignment with the pin 34 and adjacent the bottom of the shovel. The arms of the yoke 36 have forwardly extending portions 37 terminating in upwardly projecting ends 38. The distance between the rear face of the ends 38 and the forward edges of the arms of the yoke 36 is slightly greater than the overall distance between the forward edges of the pins 33 and the rear edges of the pins 34 so that when these pins are resting on the upper edges of the arms 37 the shovel will be held against movement in a horizontal plane. When so held the shovel can be pushed into a pile of material to be moved, elevated with its load and the truck driven to wherever the load is to be dumped.

In order to dump the load the shovel is lowered until it rests on the ground and the downward movement of the forks is then continued a sufficient distance from the projection 38 to be clear of the pin 33. The truck is then moved backwardly a distance somewhat less than the distance between the pins 33 and 34 and the cross head is then elevated, lifting the yoke 36. In its upward movement the arms 37 will engage the pins 34 but not the pins 33 which now lie forwardly beyond the ends 38 of the yoke, so that the shovel will be tilted to dump the load as indicated in dotted lines in Fig. 9. When elevated to the point shown by the dotted line position shown in Fig. 7, the pins 35 will engage the under side of the arm 37 and thereby hold the shovel against further tilting so that when it is again lowered to pick up another load the shovel will swing backwardly after its front edge engages the ground until it is again in horizontal position. As the downward movement of the yoke 36 continues the arms 37 are brought to a level below the pins 33 and 34. If the lift truck is now moved forwardly the arms 37 will move into position beneath the pins so as to engage both pins when the yoke is elevated to thereby lift the shovel while maintaining it in horizontal position.

The structure above described has the advantage that the shovel is not permanently fastened to the yoke so that when the yoke is lowered to a position close to the ground and the truck is then backed away a distance the length of the shovel, the yoke will be completely disengaged and the shovel may be left where placed and the truck used to pick up a similar shovel.

In Figs. 10 and 11 I have illustrated a structure somewhat similar to that shown in Fig. 9 but wherein the forks of the lift truck serve in lieu of the arms 37 to lift and dump the shovel. As here shown the shovel 40 has two cross bars 41 and 42 extending between the side walls of the shovel near the top edge and at the front and rear corners, respectively. A chain 43 may be provided having one end fastened to the rod 42 and the other end to the side of one of the lift forks 3. The back wall of the shovel is cut away to a height about two-thirds that of the shovel as indicated at 44. This structure functions in the same manner as illustrated in Fig. 9 except that the chain 43 prevents the shovel from being completely disengaged from the truck. The chain is desirable to prevent the empty shovel from being pulled off the end of the fork when the truck, after dumping the shovel, is backed away from the discharged load.

In Figs. 12, 13 and 14 I have shown modifications of my improved shovel specifically designed for attachment to the lift truck with the horizontal portions of the forks engaging the bottom of the shovel. In the arrangement shown in Fig. 12 the piece 70 forming the bottom and back of the shovel is inset between the side walls 71 to provide a space between the side walls for receiving the forks 3 of the lift truck. A bar 72 is attached at its opposite ends to the side walls of the shovel, the bar being positioned to loosely engage the under side of the forks near their ends when the shovel is firmly positioned on the forks. A chain 73 is provided for preventing the movement of the shovel completely off the forks. In using this type of shovel the operator picks up his load with the shovel firmly positioned on the forks as shown in solid lines in Fig. 12. When the load is transported to the place to be dumped the shovel is lowered, the edges of its side walls engage the ground, thereby taking the weight of the shovel and its load off the forks so that the truck may be backed away from the shovel the distance permitted by the length of the chain. If, now, the forks are elevated the ends of the forks will engage the bottom of the shovel back of the center of gravity of the load, thereby tilting the shovel to the position shown in dotted lines, and dumping the load.

In the structure shown in Figs. 13 and 14 the shovel is attached to the horizontal portions of the fork by means of a frame consisting of two plates 75, 76 connected by a clamping bolt 77. The plate 75 has vertical side flanges carrying outwardly projecting pins 78 adjacent their forward ends, which pins extend into horizontal slots 79 in the side walls of the shovel parallel with their bottom edges. The side walls of the shovel project somewhat below the plate 76 when the shovel is supported by the forks so that when the loaded shovel is lowered against the ground when it is to be dumped the weight of the shovel will be lifted off the forks, the slots 79 being wider than the diameter of the pins 78 to permit this relative vertical movement between the shovel and the fork.

When the weight is taken off the fork the truck may be backed away from the shovel a distance permitted by the length of the slots and in this position the elevation of the forks will tilt the shovel to the position shown in dotted lines and dump the load.

In Figs. 15 to 17 I have shown a modification of the shovel illustrated in Figs. 1 to 4, inclusive, wherein the shovel may automatically be given a rearward tilting movement when the shovel is loaded, to thereby elevate the front edge of the shovel so as to retain the load in the shovel without the use of a gate. As here shown the bottom of the shovel 80 is tilted up at its forward portion instead of being flat throughout its entire area. The shovel is otherwise the same as the shovel illustrated in Figs. 1 to 4, having two pins 81 and 82, respectively, at each side arranged vertically one above the other, and working in slots in yoke 83 which is provided with means for attachment to the forks of the lift shovel as previously described. The lower slots 84 which receive the pins 81 of the shovel are vertical slots with a short forwardly extending horizontal portion at the upper end. The slot 85 which receives the upper pins 82 comprises a straight portion which is inclined forwardly at its upper end joining with an arcuate extension having its center of curvature coincident with the center of the pins 81 when the latter are positioned in the forwardly extended upper portions of the lower slots.

In operating this shovel the empty shovel is brought to the pile from which the load is to be taken in the position shown in Fig. 17. The shovel is lowered until the forward edge touches the ground, then upon further downward movement of the yoke the shovel will be tilted backward around the pins 81 until the pins 82 reach the rear end of the arcuate portions of the upper slots 85, and the shovel is in the position shown in Fig. 16. In this position the forward portion of the shovel is parallel with the ground so that when the shovel is pushed into the pile of material the lower pin will be pushed backward into position overlying the vertical portion of the lower slot. After the shovel is pushed into the pile of material the load will be raised by lifting the yoke until the pins engage the lower ends of the slots. As the upper slots are inclined to the vertical the upper portion of the shovel will be tilted rearwardly during this movement, thereby raising the front end of the shovel to maintain the load in the shovel as it is transported.

When the shovel has been elevated to a sufficient height the truck is driven to the place where the load is to be dumped. The yoke is then lowered until the shovel contacts the ground, and the lowering movement continued until the pins are again in position at the top of the slots. In this position the truck is backed away from the shovel a sufficient distance for the lower pins to move into the upper horizontal portions of the lower slots and the upper pins to enter the arcuate portions of the upper slots. In this position the yoke is elevated, thereby allowing the shovel to turn about the lower pins under the weight of the load until the upper pins reach the forward ends of their slots, thereby dumping the load.

The shovels shown in Figs. 18 to 21 are designed for attachment to a bulldozer instead of a lift truck. As shown in Fig. 18, the support for the shovel consists of a backing member 50 of the same shape as the backing member of the conventional bulldozer blade with threaded sockets at the corners to receive the bolts by which the bulldozer blade is fastened to the cross head 51. At each end of the backing member 50 forwardly projecting ears 52 are formed. In the upper edge of each ear is a vertical slot 53 to receive a pin 54 set in the side of the shovel near the back wall and somewhat above the middle. Also formed in the ears 52 are right angle slots 55, the vertical portion of the slots being in line with the slots 53 and the horizontal portions at the upper ends of the vertical portions. Pins 56 project from the sides of the shovel into these right angle slots, the pins being spaced apart a distance equivalent to the distance from the bottom of the upper slot to the bottom of the lower slot. The blade-carrying ram of a bulldozer is not movable vertically in a perpendicular line but is swung up and down in a vertical arc, as illustrated in Figs. 20 and 21.

In order to load the shovel the end of the ram is lowered to substantially horizontal position and the shovel forced into the pile of material to be removed. The ram is then tilted upwardly until clear of the pile and the bulldozer driven to the point where the load is to be discharged. When the load is to be discharged the ram is tilted downwardly until the shovel, by engagement with the ground, is moved upwardly with respect to the backing member 50 until the pins 54 are clear of the slots 53 and the pins 56 are at the upper end of the vertical portions of the slots 55. If, now, the bulldozer is backed away from the shovel the pins 56 will move into the upper horizontal portion of the slot 55 while the pins 54 will move clear of the slots 53. If, now, the ram is tilted upwardly the shovel will dump its load as indicated in Fig. 2, swinging about the pins 56 as pivots until the bottom of the shovel engages the face of the backing member 50 as shown in Fig. 19.

The structure above described may, as shown in Figs. 20 and 21, be provided with a gate similar to the gate disclosed in Figs. 7 and 8, to prevent spilling the load during the travel of the shovel. To this end the wings 57 at the end of the backing member 50 are extended rearwardly as shown at 58 to receive pins 59 upon which the arms of the gate 60 are pivoted. The arms 59 are also provided with longitudinal slots fitting over the ends of the pins 56 of the shovel so that the gate will be elevated when the pins 56 are at the upper ends of their slots and will be lowered when the pins are at the lower ends of their slots. In the structure here shown the cheeks 52, instead of having open slots in their upper edges, are extended in size so as to provide for arcuate slots 61 extending from the upper ends of vertical slots 62 forwardly a sufficient distance to permit the dumping of the shovel. The extended cheeks also serve to furnish a backing for the side arms of the gate 60 to prevent the latter being bent or distorted by accidental contact with an obstruction. The operation of the shovel with the gate is the same as that of the previously described construction, the gate being positively opened by downward movement of the end of the ram and positively closed by the upward tilting of the ram when the loaded shovel is raised.

In Fig. 22 I have shown a modification of the form of shovel shown in Figs. 18 and 19 wherein the shovel is adapted for attachment to the bulldozer blade itself so that the latter does not have to be removed from the bulldozer when the machine is to be used as a shovel. As here shown, the backing plate carrying the cheeks 52 is provided at its upper and lower horizontal edges with U-shaped extensions 64 spaced apart a distance to receive between them the bulldozer blade 63. The short sides of the U-shaped extension 64 are provided with clamping bolts 65 screwed down against the back of the bulldozer blade at its top and bottom edges to thereby firmly clamp the shovel against the blade.

In the foregoing specification I have described a number of embodiments of my invention in sufficient detail for such embodiments to be readily fabricated by those skilled in the art, but it is to be understood that my invention is not limited to the details herein disclosed except insofar as recited in the appended claims.

The expression "vertically movable" in the appended claims is intended to define both the rectilinear movement of the cross head of the lift truck and the arcuate movement of the ram of the bulldozer or any similar movement toward or away from a supporting surface.

I claim:

1. An attachment of the class described comprising a shovel, a support therefor and connections between said shovel and said support consisting solely of interengaging parts on said shovel and said support, said connections permitting both a bodily vertical movement of said shovel relative to said support and a tilting motion thereof, said connections in one position of said shovel on said support holding said shovel against tilting movement and in another position permitting a limited tilting of the shovel.

2. An attachment of the class described comprising a shovel, a support therefor, connections between said shovel and said support permitting both a bodily movement of said shovel relative to said support and a tilting motion thereof, said connections consisting of pins on one of said members, slots on the other member, said slots being shaped to hold said shovel against tilting movement when said shovel is at its lowest position of bodily movement with respect to said support and to permit limited tilting movement of the shovel in another relative position of said members.

3. An attachment of the class described comprising a shovel, a yoke for supporting said shovel, said yoke having slots adjacent the side walls of said shovel, pins on said shovel projecting into said slots, said slots being shaped to permit a limited vertical movement of the shovel relative to the yoke and a limited tilting movement of the shovel about the axis of said pins when positioned at the upper limit of its relative vertical movement.

4. An attachment of the class described comprising a shovel, a support therefor, pin-and-slot connections between said shovel and said support permitting a limited vertical movement between said shovel and said support, a gate pivoted on said support for closing the open edge of said shovel, and operating connections between said gate and certain of said pins to close said shovel when the pins are at the lower ends of their slots and open the shovel when the pins move toward the upper ends of their slots.

5. An attachment for vehicles having vertically movable crossheads comprising a supporting member, means for attaching same to the vertically movable crosshead thereof, a shovel carried by said supporting member and connections consisting solely of interengaging parts on said shovel and said supporting member permitting both bodily and pivotal movement of said shovel relative to said support, said connections holding said shovel against tilting movement when the shovel is moved forwardly by said vehicle and when lifted after such forward movement while permitting a tilting movement of said shovel when elevated after a backward movement of said vehicle.

6. An attachment for vehicles having vertically movable crossheads comprising a support for attachment to the vertically movable crosshead thereof, a shovel carried by said support, connections between said shovel and said support, said connections consisting solely of interengaging parts on said support and shovel, respectively, said parts being designed to hold said shovel against tilting movement when moved forwardly by said vehicle, to tilt said shovel in one direction when said support is moved upwardly after such forward movement and to tilt said shovel in the opposite direction when said support is moved upwardly after a rearward movement of said support.

References Cited in the file of this patent

UNITED STATES PATENTS

| | | |
|---|---|---|
| 136,659 | Lovell | Mar. 11, 1873 |
| 2,099,604 | Gunning | Nov. 16, 1937 |
| 2,180,658 | Austin | Nov. 29, 1939 |
| 2,319,456 | Hazen | May 18, 1943 |
| 2,326,338 | Drott et al. | Aug. 10, 1943 |
| 2,383,686 | Ryan | Aug. 28, 1945 |
| 2,387,764 | Maxwell | Oct. 30, 1945 |
| 2,421,472 | Way | June 3, 1947 |
| 2,482,692 | Quales et al. | Sept. 20, 1949 |
| 2,483,033 | Baker | Sept. 27, 1949 |
| 2,530,414 | Wells | Nov. 21, 1950 |
| 2,545,235 | Lamy | Mar. 13, 1951 |

FOREIGN PATENTS

| | | |
|---|---|---|
| 6503/27 | Australia | Mar. 21, 1927 |
| 137,952 | Australia | July 13, 1950 |